US012145010B2

(12) United States Patent
Dzugan

(10) Patent No.: US 12,145,010 B2
(45) Date of Patent: Nov. 19, 2024

(54) SAFETY HARNESS DEVICE

(71) Applicant: Hans-Julian Dzugan, Braunau (AT)

(72) Inventor: Hans-Julian Dzugan, Braunau (AT)

( * ) Notice: Subject to any disclaimer, the term of this patent is extended or adjusted under 35 U.S.C. 154(b) by 1140 days.

(21) Appl. No.: 16/622,883

(22) PCT Filed: Jun. 14, 2018

(86) PCT No.: PCT/AT2018/060124

§ 371 (c)(1),
(2) Date: Dec. 13, 2019

(87) PCT Pub. No.: WO2018/227226

PCT Pub. Date: Dec. 20, 2018

(65) Prior Publication Data

US 2020/0206551 A1 Jul. 2, 2020

(30) Foreign Application Priority Data

Jun. 14, 2017 (AT) .................................. 50498/2017

(51) Int. Cl.
*A62B 35/04* (2006.01)
*A62B 35/00* (2006.01)
*E04G 21/32* (2006.01)

(52) U.S. Cl.
CPC .......... *A62B 35/04* (2013.01); *A62B 35/0018* (2013.01); *A62B 35/0025* (2013.01); *A62B 35/0037* (2013.01); *E04G 21/3204* (2013.01)

(58) Field of Classification Search
CPC ............................ A62B 35/04; E04G 21/3204
See application file for complete search history.

(56) References Cited

U.S. PATENT DOCUMENTS 5,076,400 A * 12/1991 Petzl ........................ A62B 1/14 24/134 P
5,878,833 A * 3/1999 Bell ..................... A62B 35/005 182/5

(Continued)

FOREIGN PATENT DOCUMENTS

CN 204317770 U 5/2015
CN 205268858 U 6/2016

(Continued)

OTHER PUBLICATIONS

Japanese Patent Office, Office Action Issued in Application No. 2019-566105, Dec. 1, 2020, 5 pages.

(Continued)

*Primary Examiner* — Jessica L Laux
*Assistant Examiner* — Kathleen M. McFarland
(74) *Attorney, Agent, or Firm* — McCoy Russell LLP

(57) ABSTRACT

The invention relates to a safety harness device for catching a person if they fall, in particular in the case of construction activities, comprising at least one shoulder strap, which has a chest portion, a shoulder portion and a back portion, comprising a locking element for releasably attaching a safety rope, wherein the locking element can be transferred between a working position, in which the locking element is arranged on the back portion side of the shoulder strap, and a catch position, in which the locking element is arranged on the chest portion side of the shoulder strap.

17 Claims, 3 Drawing Sheets

(56) References Cited

U.S. PATENT DOCUMENTS

| | | | | |
|---|---|---|---|---|
| 6,367,582 | B1 * | 4/2002 | Derby | A62B 35/0037 182/7 |
| 6,374,946 | B1 * | 4/2002 | Petzl | A62B 35/0018 182/7 |
| 8,584,799 | B1 * | 11/2013 | Dennington | A62B 35/04 182/4 |
| 9,162,089 | B2 * | 10/2015 | Harshbarger | A62B 35/0006 |
| 9,737,736 | B2 * | 8/2017 | Boothby | A62B 35/0018 |
| 9,993,670 | B2 * | 6/2018 | Kozuki | A62B 35/0093 |
| 10,035,029 | B2 * | 7/2018 | Dawson | A62B 35/0012 |
| 11,065,482 | B2 * | 7/2021 | Cooper | A62B 35/0075 |
| 2007/0209868 | A1 * | 9/2007 | Betcher | A62B 35/0025 182/3 |
| 2010/0025148 | A1 * | 2/2010 | Dawson | A62B 35/0012 182/3 |
| 2010/0229357 | A1 * | 9/2010 | Sample | B64D 25/06 24/601.5 |
| 2011/0099776 | A1 * | 5/2011 | Anscher | A44B 11/266 24/701 |
| 2012/0000004 | A1 * | 1/2012 | Hellweg | F41H 1/02 2/102 |
| 2012/0023638 | A1 * | 2/2012 | Leicester | A62B 35/0025 2/69 |
| 2012/0024627 | A1 * | 2/2012 | Harshbarger | A62B 35/04 182/5 |
| 2013/0319793 | A1 * | 12/2013 | Stibilj | A62B 35/0025 182/3 |
| 2015/0375021 | A1 * | 12/2015 | Kozuki | A62B 35/0043 242/383.2 |
| 2016/0206903 | A1 * | 7/2016 | Boothby | A62B 35/0018 |
| 2018/0311518 | A1 * | 11/2018 | Cooper | F16B 45/06 |

FOREIGN PATENT DOCUMENTS

| | | | |
|---|---|---|---|
| EP | 2724752 | A2 | 4/2014 |
| EP | 3045209 | A2 | 7/2016 |
| JP | 2014506815 | A | 3/2014 |

OTHER PUBLICATIONS

State Intellectual Property Office of the People's Republic of China, Office Action and Search Report Issued in Application No. 201880039818.0, Jul. 28, 2020, 23 pages. (Submitted with Partial Translation).

ISA European Patent Office, International Search Report Issued in Application No. PCT/AT2018/060124, Sep. 26, 2018, WIPO, 4 pages.

* cited by examiner

SAFETY HARNESS DEVICE

CROSS-REFERENCE TO RELATED APPLICATIONS

The present application is a U.S. National Phase of International Patent Application Serial No. PCT/AT2018/060124 entitled "SAFETY HARNESS DEVICE," filed on Jun. 14, 2018. International Patent Application Serial No. PCT/AT2018/060124 claims priority to Austrian Patent Application No. A 50498/2017 filed on Jun. 14, 2017. The entire contents of each of the above-referenced applications are hereby incorporated by reference for all purposes.

TECHNICAL FIELD

The invention relates to a safety harness device for catching a person if they fall, in particular in the case of building construction activities, comprising at least one shoulder strap, which comprises a chest portion, a shoulder portion and a back portion, and a locking element for releasably attaching a safety rope.

BACKGROUND AND SUMMARY

Such a safety harness with a closure device and holding device is known for example from DE 200 22 993 U1. The safety harness has a belt strap line and a shoulder strap line. The shoulder strap line has two portions, which are arranged crossed at the back of a wearer. This crossing point bears a safety eyelet, to which a safety cord can be secured.

In the case of building construction activities, standard safety harnesses are used, in which the safety rope (fall protection rope) is secured to a safety eyelet in the back region of the wearer. As a result of this the wearer of the safety harness is not prevented from performing their work activities. This embodiment, however, brings the serious disadvantage that the wearer, in the event of a fall, must be freed from the safety rope as quickly as possible. Being suspended from the back may lead within a short space of time to a life-threatening load (stress). In some circumstances, death may occur after a loading time of just 20 minutes. The reason for this is that hanging from the back by one's own body weight places high pressure on the ribcage, the leg arteries and leg veins, whereby breathing and circulation are significantly impaired.

On the other hand, safety harnesses are known for other applications, in particular climbing harnesses, in which the holding rope is attached to the front side or chest side of the wearer, whereby the non-lethal time for which a person can remain "on the rope" after falling is increased to at least 60 minutes. This embodiment, however, does not appear to be appropriate in the construction field, since the attachment of the holding rope to the chest would compromise the freedom of movement of the arms of the wearer, such that it would not be possible for the individual to carry out work activities efficiently.

The object of the present invention is therefore to overcome or at least mitigate disadvantages of the prior art. The objective of the invention is therefore to create a safety harness device for building construction activities which improves the stress (load) on the wearer in the event of a fall.

In accordance with the invention the locking element can be transferred between a working position, in which the locking element is arranged on the back portion side of the shoulder strap, and a catch position, in which the locking element is arranged on the chest portion side of the shoulder strap.

In order to enable work activities to be performed freely and unhindered, the locking element is arranged in the working position on the rear side of a wearer of the safety harness device. The end portion of the safety rope connected to the locking element is thus located in the back region of the wearer when building construction activities, for example on a metal framework structure, are being performed. In other words, attachment of the safety rope to the back is provided in the working position (i.e. the support rope is arranged on the back portion of the shoulder strap). It is thus possible to carry out work activities freely and unimpeded, wherein at the same time the required protection against falling is achieved. In the event of a fall the independent displacement of the locking element from the working position into the catch position is triggered. During the transfer from the working position into the catch position, the locking element and thus also the safety rope is guided from the rear side of the wearer to the chest side or front side of the wearer. In this position the safety rope is arranged on the front side or the chest side of the wearer. The locking element or the end region of the safety rope connected thereto thus follows a path of movement from the back of the wearer, preferably over their shoulder, to the chest region. The ribcage of the wearer is advantageously exposed merely to a minimal loading (or stress) in the catch position because of the attachment in the area of the chest. Since the safety rope is transferred from arrangement at the back to arrangement in the chest region during the course of a fall or within a few seconds after a fall, the wearer can remain for much longer on the safety rope before a health-endangering loading as a result of compressive forces occurs. Thus, advantageously the freedom of movement when performing work activities can be combined with a higher degree of safety in the event of a fall.

For the purposes of this disclosure, the location and direction specifications relate to the state of the safety harness when used as intended. For example, "front", "front side", etc. relate to the chest region of the wearer, and "rear", "rear side", etc. relate to the back region of the wearer.

In order to enable the displacement of the locking element from the rear side to the front side of the person to be protected, a catch element is preferably provided on the side of the chest portion of the shoulder strap, and a connection element, preferably a connection cord, for connecting the locking element to the catch element, is preferably provided. The catch element is fixed on the front side, i.e. on the side of the chest portion of the shoulder strap. For example, a safety eyelet which in particular is connected to the chest portion of the shoulder strap may be provided as catch element. The connection element is on the one hand connected to the catch element on the front side of the wearer and on the other hand is connected to the locking element, which is situated on the rear side of the wearer in the working position. A connection cord is preferably provided as connection element, wherein for the purposes of this disclosure this is understood to mean also a belt, a strap or another longitudinal element deformable transversely to the longitudinal direction. In the event of a fall the locking element is displaced from the rear side to the front side of the wearer by the longitudinal force via the safety rope, such that the weight of the wearer is taken up via the catch element on the front side.

For this purpose it is preferred for one end of the connection element to be connected to the locking element and for the other end of the connection element to be connected to the catch element. In the working position the connection element is in a state unloaded by the weight of the wearer of the safety harness, wherein the weight of the wearer is taken up by the locking element on the rear side. In the safety position the connection element is in the loaded state, wherein the weight of the wearer is taken up via the catch element on the front side or chest side.

In order to offer maximum freedom of movement to the wearer, achieve high safety standards, and make the shoulder strap easier to put on, it is favourable if the connection element in the working position is guided along the shoulder strap at least in some sections, preferably substantially over the entire longitudinal extent of the connection element.

For the above-mentioned reasons it is additionally advantageous if the connection element is received between the shoulder strap and a cover part, in particular a cover woven fabric, in the working position.

In accordance with a preferred embodiment the cover part is connected to the shoulder strap via a joint, in particular via a seam. The displacement of the suspension from the rear side to the front side in the event of a fall may thus be delayed. The weight of the wearer in the event of a fall is thus advantageously shifted from the suspension from the back to the suspension from the chest relatively gently. At the end of the fall the wearer is suspended from the safety rope in a stable position not substantially detrimental to breathing or blood circulation.

In accordance with a further preferred embodiment a holding element for connection of the locking element to the shoulder strap and a release device for releasing the locking element from the holding element are provided. The holding element is fixedly connected on the rear side of the wearer to the shoulder strap, in particular to the back portion thereof. The release device causes the locking element to be released from the holding element by the catch forces in the event of a fall. The weight of the wearer is thus transferred to the catch element on the front side.

In a preferred variant the release device comprises a latch and a latch receptacle, wherein the latch in the working position is connected to the latch receptacle, and the latch can be transferred into a release position released from the latch receptacle by applying a predefined longitudinal force to the locking element. In the normal case the safety rope is therefore arranged at the locking element on the rear side of the wearer so as not to hinder the wearer in carrying out their work activities. Only in the event of a fall will the release device be activated, by means of which the locking element is released from the holding element so as to enable the displacement of the locking element to the front side.

From a structural viewpoint it is favourable if the latch is mounted in particular pivotably on the holding element, wherein the locking element comprises the latch receptacle. However, the latch may also be provided on the locking element, and the latch receptacle on the holding element.

In order to define a specific release force, it is advantageous if the release device comprises a spring element, against the spring force of which the locking element can be released from the holding element.

The release device particularly preferably comprises a damping element for braking a release movement of the locking element relative to the holding element. The damping element causes a time delay during the release process.

The invention will be further explained hereinafter on the basis of a preferred exemplary embodiment, to which, however, the invention is not intended to be limited. In the drawing:

DETAILED DESCRIPTION

Figure 1:
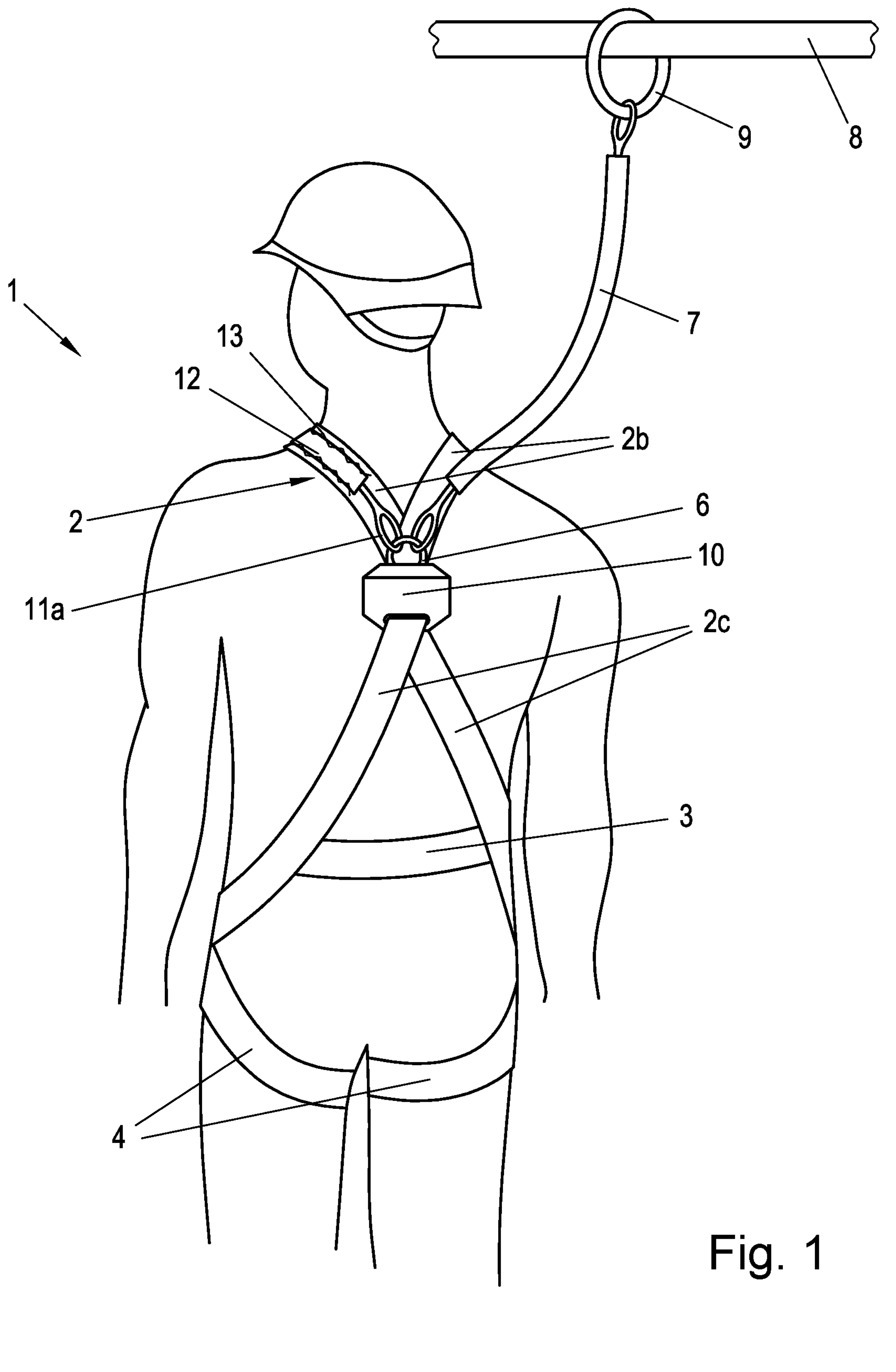
FIG. 1 shows the rear side of a wearer of a safety harness device according to the invention with a shoulder strap and leg loops in the working position, wherein a safety rope is suspended from a locking element on the back of the wearer so as to allow construction activities to be carried out unimpeded.
Figure 2:
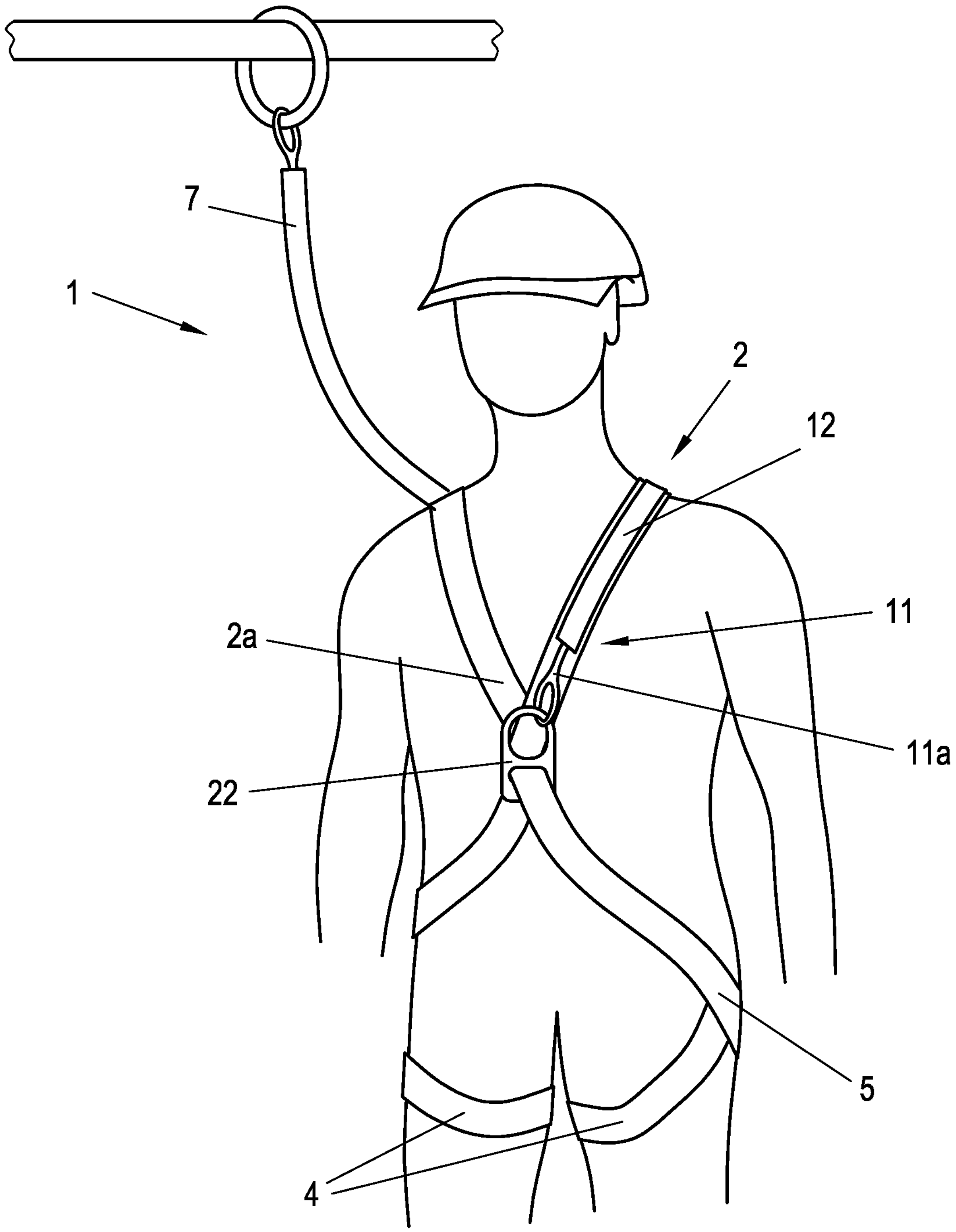
FIG. 2 shows the front side of a wearer of the safety harness device in the working position, wherein a catch element in the chest region of the wearer is connected to the locking element via a connection cord.

FIG. 1 shows the rear side, and FIG. 2 shows the front side of a worker carrying out building construction activities and protected by a safety harness device 1 for catching the worker in the event of a fall. The safety harness device 1 comprises two shoulder straps 2, each with a chest portion 2*a*, a shoulder portion 2*b*, and a back portion 2*c*. The chest portion 2*a*, shoulder portion 2*b* and back portion 2*c* in this exemplary embodiment are formed in one part. The back portions 2*c* and the chest portions 2*a* of the shoulder straps 2 are each arranged crosswise. For improved stabilisation, the back portions 2*c* are connected via a transverse portion 3. The safety harness device 1 additionally comprises two leg straps 4, which are formed as loops or nooses for the left and right leg. The leg straps 4 are fixedly connected to the shoulder strap 2 at connection points 5. Alternatively, leg straps 4 and shoulder straps 2 may also be formed in one part. The safety harness device 1 comprises a locking element 6 for releasably attaching a safety rope 7 (fall protection rope 7). The locking element 6 is releasably connected to one end of the safety rope 7, wherein the other end is secured to a scaffold bar 8. The fastening to the scaffold bar 8 is achieved via a fastening ring 9, which in the shown embodiment is displaceable along the longitudinal extent of the scaffold bar 8.

In this regard the safety harness device 1 is known in principle from the prior art, and therefore no further explanations are necessary in this respect. The known elements of the safety harness device 1 are shown only schematically in the drawings.

It is essential to the presented embodiment of the safety harness device 1 that the locking element 6 for the safety rope 7 can be transferred between a working position, in which the locking element 6 is arranged on the back portion 2*c* side of the shoulder strap 2 (FIG. 1), and a catch position, in which the locking element 6 is arranged on the chest portion 2*a* side of the shoulder strap 2.

For this purpose the shoulder strap 2 comprises a catch element 22 on the side of the chest portion 2*a*. The catch element 22 is formed for example as a safety eyelet in accordance with standard DIN EN361:2002. The catch element 22 is connected to the locking element 6 via a connection element 11. In this exemplary embodiment the connection element 11 is a connection cord 11*a*, which is guided along the shoulder strap 2 in the working position. The connection cord 11*a* is received between the shoulder strap 2 and a cover part 12, in this case a cover woven fabric. The cover part 12 is connected to the shoulder strap 2 via a joint, in particular via a seam 13. In the event of a transition of the safety harness device 1 from the working position into the catch position as the result of a fall, the locking element 6 is guided along the shoulder strap 2 from the back portion 2*c* thereof to the chest portion 2*a* thereof. During this transition, the seam 13 tears successively, starting at the back portion 2*c*, whereby the connection cord 11 is released and together with the locking element 6 moves in the direction of the chest portion 2*a*. In the catch position the connection cord 11*a* is completely released and is no longer received between the shoulder strap 2 and the cover part 12. In the catch position the safety rope 7 is connected via the locking element 6 and the connection cord 11*a* to the catch element 22 at the chest portion 2*a* of the shoulder strap 2. The safety rope 7 is therefore arranged on the chest side of the wearer in the catch position. The carrier thus hangs in the rope with their back facing downward and with their chest oriented upwardly.

Figure 3A:
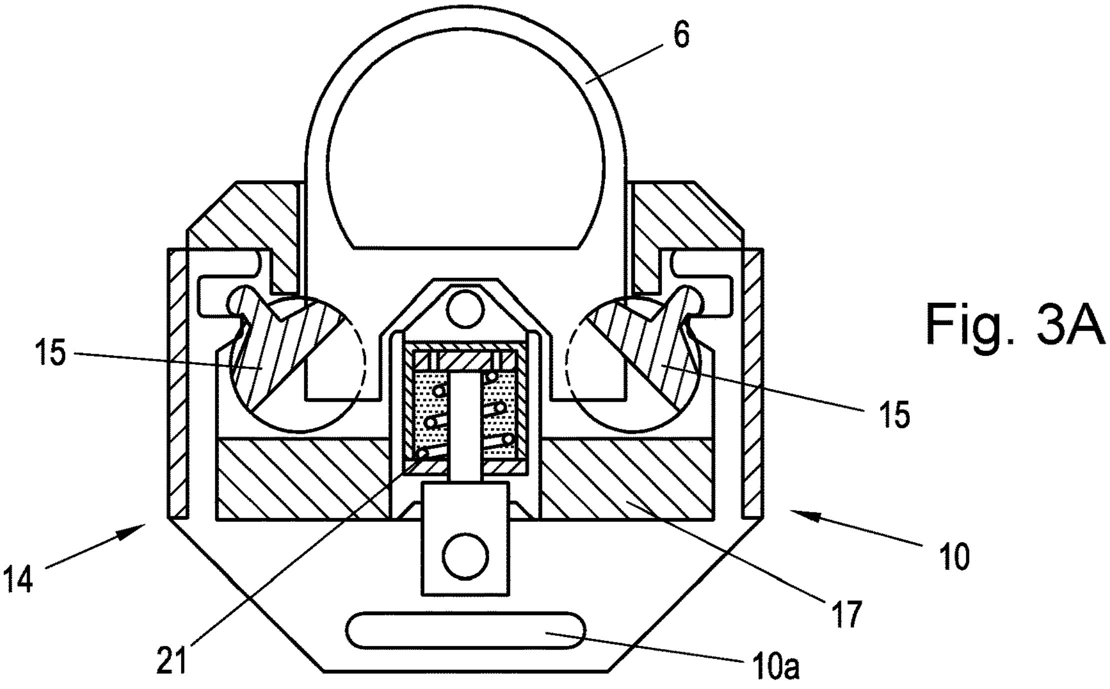
FIG. 3A shows a detailed view of the suspension of the safety rope from the back in the working position, wherein the locking element is latched to a holding element at the back portion of the shoulder strap.
Figure 3B:
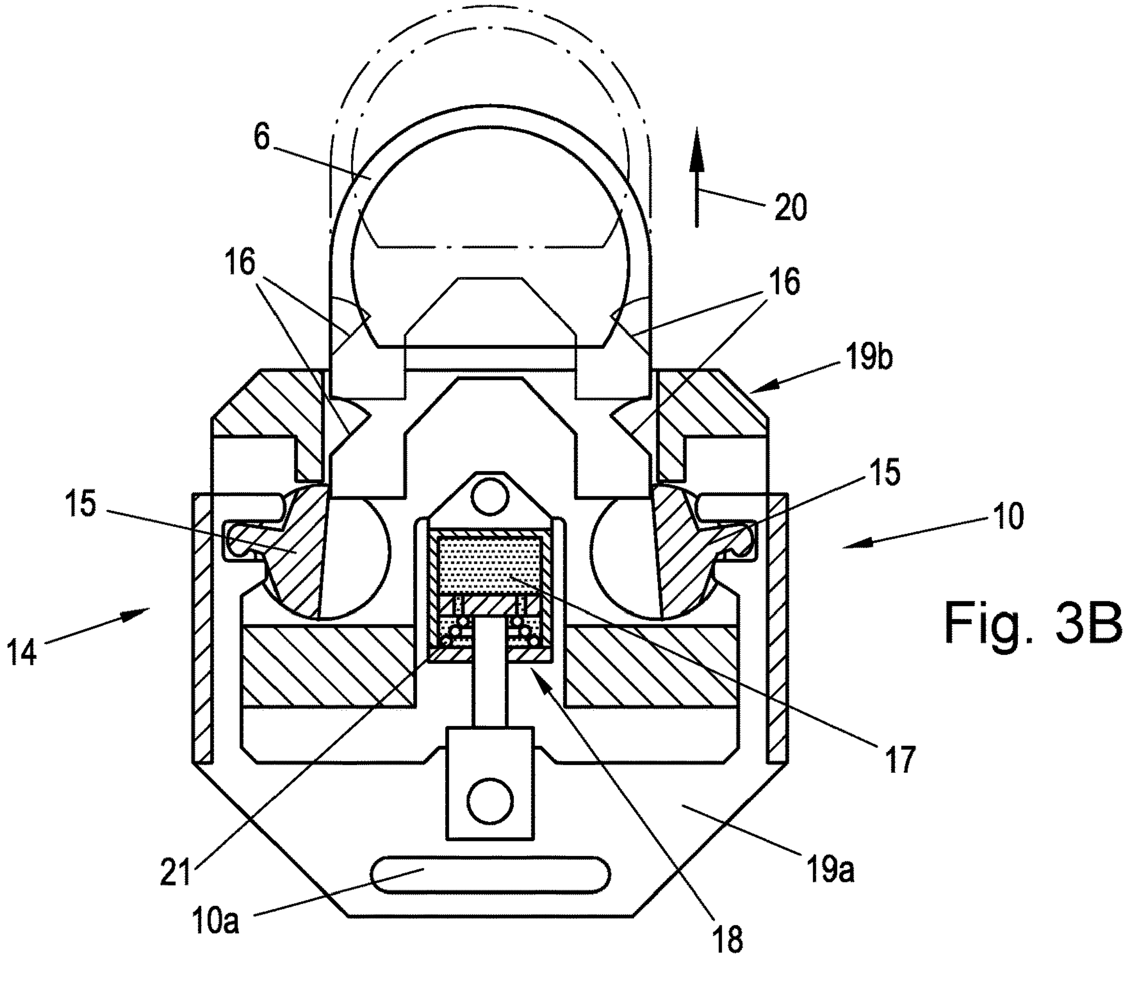
FIG. 3B shows a detailed view of the locking element during the release process in the event of a fall in the safety harness.

As can be seen from FIGS. 3A and 3B, a holding element 10 connects the locking element 6 to the shoulder strap 2. The holding element 10 is fixedly connected to the back portion 2*c* of the shoulder strap 2 via a holding opening 10*a*.

In order to release the locking element 6 from the holding element 10, a release device 14 is provided. The release device 14 comprises at least one rotatably mounted latch 15; in the shown embodiment two corresponding latches 15 are provided. The locking element 6 comprises a matching latch receptacle 16 (two latch receptacles in the shown embodiment), wherein each latch 15 in the working position is received in the associated latch receptacle 16 (see FIG. 3A). The latch 15 may be transferred in the event of a fall into a release position released from the latch receptacle 16 by application of a predefined longitudinal force to the locking element 6 (see arrow 20 in FIG. 3B). In the shown embodiment the latches 15 are mounted pivotably on the holding element 10. Due to the effect of the longitudinal force in the arrow direction 20 on the locking element 6, the latches 15 are pivoted. The release device 14 also comprises a spring element 21, against the spring force of which the locking element 6 is releasable from the holding element 10. The spring force defines the force that must be applied in order to release the locking element 6 from the holding element 10. In the shown embodiment the holding element 10 comprises a first part 19*a* fixedly connected to the strap element 2, with the holding opening 10*a*, and a second part 19*b* mounted displaceably relative to the first part 19*a*. The spring element 21 is arranged between the first part 19*a* and the second part 19*b* in such a way that the spring element 21 is compressed under a tensile force exerted on the locking element 6 as a result of the impact, until the latches 15 are released from the latch receptacles 16. Following the removal of the locking element 6 from the holding element 10, the spring element 21 returns into its relaxed starting position.

In the shown embodiment a damping element 17 for braking the release process is additionally provided. In the shown embodiment a hydraulic spring damper 18 is provided for forming the spring element 21 and the damper element 17.

The invention claimed is:

1. A safety harness device for catching a person, comprising:

at least one shoulder strap, which comprises a chest portion, a shoulder portion and a back portion, a locking element configured to releasably attach a safety rope, wherein the locking element is transferable between a working position, in which the locking element is arranged on the back portion side of the shoulder strap, and a catch position, in which the locking element is arranged on the chest portion side of the shoulder strap, a holding element configured to connect the locking element to the shoulder strap, and a release device configured to release the locking element from the holding element, wherein the locking element in the working position is connected to the holding element, wherein the release device comprises a latch and a latch receptacle, wherein the latch in the working position is connected to the latch receptacle, the latch being transferable into a release position by applying a predefined longitudinal force to the locking element, wherein, in the release position, the latch is released from the latch receptacle and the locking element is released from the holding element, wherein the release device is configured to be activated in the event of a fall and cause the locking element to be released from the holding element by catch forces of the fall, and wherein the holding element is fixedly connected to the shoulder strap in the working position as well as in the catch position.

2. The safety harness device according to claim 1, wherein a catch element is provided on the chest portion side of the shoulder strap and a connection element for connection of the locking element to the catch element is provided.

3. The safety harness device according to claim 2, wherein the connection element in the working position is guided along the shoulder strap at least in some sections.

4. The safety harness device according to claim 3, wherein the connection element in the working position is received between the shoulder strap and a cover part.

5. The safety harness device according to claim 4, wherein the cover part is connected to the shoulder strap via a joint.

6. The safety harness device according to claim 1, wherein the latch is mounted on the holding element, wherein the locking element comprises the latch receptacle.

7. The safety harness device according to claim 1, wherein the release device comprises a spring element, and against the spring force of the spring element, the locking element is released from the holding element.

8. The safety harness device according to claim 1, wherein the release device comprises a damping element for braking a release movement of the locking element relative to the holding element.

9. The safety harness device according to claim 2, wherein the connection element is a connection cord.

10. The safety harness device according to claim 2, wherein the connection element in the working position is guided along the shoulder strap over the entire longitudinal extent of the connection element.

11. The safety harness device according to claim 4, wherein the cover part is a woven fabric.

12. The safety harness device according to claim 5, wherein the joint is a seam.

13. The safety harness device according to claim 6, wherein the latch is mounted pivotably.

14. The safety harness device according to claim 1, wherein, in the working position, the locking element is held together with the holding element via the latch, and, in the event of a fall, the latch is released and the locking element separates from the holding element due to catch forces of the fall.

15. The safety harness device according to claim 14, wherein the latch and the locking element are no longer in contact in the catch position.

16. A safety harness device for catching a person, comprising:

at least one shoulder strap, which comprises a chest portion, a shoulder portion and a back portion, a locking element configured to releasably attach a safety rope, wherein the locking element is transferable between a working position, in which the locking element is arranged on the back portion side of the shoulder strap, and a catch position, in which the locking element is arranged on the chest portion side of the shoulder strap, a holding element configured to connect the locking element to the shoulder strap, wherein the holding element remains attached to the shoulder strap in the working position as well as in the catch position, a release device configured to release the locking element from the holding element, wherein the locking element in the working position is accommodated in the holding element, wherein the release device comprises a latch and a latch receptacle, wherein the latch in the working position is connected to the latch receptacle, the latch being transferable into a release position by applying a predefined translational force to the locking element, wherein, in the release position, the latch is released from the latch receptacle and the locking element is released and thereby removed from the holding element, and wherein the release device is configured to be activated in the event of a fall and cause the locking element to be released and extracted from the holding element by catch forces of the fall, and a connection cord connected to the shoulder strap, wherein the locking element is attached to the connection cord in the working position as well as in the catch position.

17. A safety harness device for catching a person, comprising:

at least one shoulder strap, which comprises a chest portion, a shoulder portion and a back portion, a locking element configured to releasably attach a safety rope, wherein the locking element is transferable between a working position, in which the locking element is arranged on the back portion side of the shoulder strap, and a catch position, in which the locking element is arranged on the chest portion side of the shoulder strap, a holding element configured to connect the locking element to the shoulder strap, and a release device configured to release the locking element from the holding element, wherein the locking element in the working position is connected to and inserted into the holding element, wherein the release device comprises a latch and a latch receptacle, wherein the latch in the working position is connected to the latch receptacle, the latch being transferable into a release position by applying a predefined translational force to the locking element, wherein, in the release position, the latch is released and thereby removed from the latch receptacle and the locking element is released and extracted from the holding element, wherein the release device is configured to be activated in the event of a fall and cause the locking element to be released from the holding element by catch forces of the fall, wherein the holding element is attached to the shoulder strap in the working position as well as in the catch position, and wherein, in the catch position, the locking element is distant to the holding element.

* * * * *